(12) United States Patent
Takano et al.

(10) Patent No.: US 10,622,854 B2
(45) Date of Patent: Apr. 14, 2020

(54) ROTOR

(71) Applicant: FANUC CORPORATION, Yamanashi (JP)

(72) Inventors: Shinobu Takano, Yamanashi (JP); Takafumi Kajiya, Yamanashi (JP); Yohei Arimatsu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/114,618

(22) Filed: Aug. 28, 2018

(65) Prior Publication Data
US 2019/0081524 A1    Mar. 14, 2019

(30) Foreign Application Priority Data
Sep. 12, 2017   (JP) .................................. 2017-174528

(51) Int. Cl.
*H02K 1/28* (2006.01)
*H02K 1/27* (2006.01)
*H02K 5/173* (2006.01)
*H02K 9/19* (2006.01)

(52) U.S. Cl.
CPC ............... *H02K 1/278* (2013.01); *H02K 1/28* (2013.01); *H02K 5/1732* (2013.01); *H02K 9/19* (2013.01)

(58) Field of Classification Search
CPC .............................................. H02K 1/27–2793
USPC ............ 310/156.01, 156.12, 156.28, 156.31
See application file for complete search history.

(56) References Cited

U.S. PATENT DOCUMENTS

| | | | | |
|---|---|---|---|---|
| 5,457,870 A | * | 10/1995 | Canders | H02K 1/278 156/294 |
| 5,744,887 A | * | 4/1998 | Itoh | H02K 1/278 310/156.28 |
| 2014/0300233 A1 | * | 10/2014 | Arimatsu | H02K 1/278 310/156.12 |

FOREIGN PATENT DOCUMENTS

| | | |
|---|---|---|
| CN | 1142701 A | 2/1997 |
| CN | 105529850 A | 4/2016 |
| JP | S54-006934 A | 1/1979 |
| JP | S57-134921 A | 8/1982 |
| JP | H09-019093 A | 1/1997 |
| JP | 2001-252974 A | 9/2001 |
| JP | 2002-058190 A | 2/2002 |
| JP | 2016-082773 A | 5/2016 |

OTHER PUBLICATIONS

An Office Action mailed by the Japanese Patent Office dated Jun. 25, 2019, which corresponds to Japanese Patent Application No. 2017-174528 and is related to U.S. Appl. No. 16/114,618.
(Continued)

*Primary Examiner* — Thomas Truong
(74) *Attorney, Agent, or Firm* — Studebaker & Brackett PC (57) ABSTRACT

A rotor includes: a rotary member; a plurality of permanent magnets that are arranged on the outer circumferential side of the rotary member; and a cover tube that is provided on the side of an outer circumferential surface of the plurality of the permanent magnets and that is formed with a fiber bundle in which a plurality of fiber reinforced plastic filaments are arranged along a longitudinal direction, and the fiber bundle of the cover tube is spirally stacked in layers along a circumferential direction of the rotary member such that a part of the fiber bundle in a width direction is slackened.

3 Claims, 7 Drawing Sheets

(56) References Cited

OTHER PUBLICATIONS

An Office Action mailed by the State Intellectual Property Office of the People's Republic of China dated Feb. 3, 2020, which corresponds to Chinese Patent Application No. 201811049826.1 and is related to U.S. Appl. No. 16/114,618; with English language translation.

* cited by examiner

ROTOR

This application is based on and claims the benefit of priority from Japanese Patent Application No. 2017-174528, filed on 12 Sep. 2017, the content of which is incorporated herein by reference.

BACKGROUND OF THE INVENTION

Field of the Invention

The present invention relates to a rotor which is used in a rotary electric machine.

Related Art

As one type of motor in which a permanent magnet is used as a rotor, an SPM (Surface Permanent Magnet) type motor is known in which on the outer circumferential side of rotary members (such as a sleeve and a rotary axis), a permanent magnet is arranged. In this kind of SPM type motor, in order to reduce the dropping off of the permanent magnet from the rotor by centrifugal force when high speed rotation is performed by increasing the number of revolutions, a cover tube is fitted so as to cover the outer circumference of the permanent magnet. As a material of which the cover tube is formed, a fiber reinforced plastic (FRP) is increasingly used, for example, because it has a high strength and a light weight, and in particular, a carbon fiber reinforced plastic (hereinafter also referred to as a "CFRP") is often used (see, for example, patent document 1).

Patent Document 1: Japanese Unexamined Patent Application, Publication No. H09-19093

SUMMARY OF THE INVENTION

The cover tube described above is formed, for example, by winding a fiber bundle of the CFRP on a tubular fixture. Since the diameter of one fiber in the CFRP is so thin as to be, for example, a few micrometers, the bundled fibers may overlap each other or may be cut in some places. The fiber bundle of the CFRP may be formed in the shape of a bead (hereinafter also referred to as a "pill") resulting from the fibers being entangled with each other. Hence, in the formed cover tube, the thickness of the tube and the density of the fibers are more likely to be nonuniform.

An object of the present invention is to provide a rotor in which the thickness of the tube of a cover tube and the density of fibers are more uniform.

(1) The present invention relates to a rotor (for example, a rotor 30 which will be described later) includes: a rotary member (for example, a rotary axis 35 which will be described later); a plurality of permanent magnets (for example, permanent magnets 32 which will be described later) that are arranged on the outer circumferential side of the rotary member; and a cover tube (for example, a cover tube 33 which will be described later) that is provided on the side of an outer circumferential surface of the plurality of the permanent magnets and that is formed with fiber bundle (for example, a CF fiber bundle 133 which will be described later) in which a plurality of fiber reinforced plastic filaments are arranged along a longitudinal direction, where the fiber bundle of the cover tube is spirally stacked in layers along a circumferential direction (for example, a circumferential direction DR which will be described later) of the rotary member such that a part of the fiber bundle in a width direction (for example, a width direction DW which will be described later) is slackened.

(2) Preferably, in the rotor of (1), the fiber bundle of the cover tube is integrated with a resin in a state where the fiber bundle is spirally stacked in layers along the circumferential direction of the rotary member.

(3) Preferably, in the rotor of (1) or (2), the fiber reinforced plastic is a carbon fiber reinforced plastic.

According to the present invention, it is possible to provide a rotor in which the thickness of the tube of a cover tube and the density of fibers are more uniform.

DETAILED DESCRIPTION OF THE INVENTION

An embodiment of the present invention will be described below. Drawings attached to the present specification are all schematic views, and with consideration given to ease of understanding and the like, the shapes, the scales, the vertical dimension ratios and the like of individual portions are changed from real things or exaggerated. In the drawings, hatching indicating the cross sections of members will be omitted as necessary.

In the present specification and the like, shapes, geometric conditions and terms for specifying the degrees thereof, for example, terms such as "parallel" and "direction" include not only the exact meanings of the terms but also a range which is regarded of being substantially parallel and a range which is regarded of being substantially in that direction. In the present specification and the like, a line that serves as the rotation center of a rotary axis 35 which will be described later is also referred to as a "rotary axis line L", and a direction that is along the rotary axis line L is also referred to as a "rotary axis direction". In the present specification and the like, a bundle obtained by flatly bundling a CFRP into the shape of a tape is also referred to as a "fiber bundle of the CFRP" or a "CFRP fiber bundle", and a bundle obtained by flatly bundling a CF (carbon fiber) into the shape of a tape is also referred to as a "CF fiber bundle". One fiber of the CFRP is also referred to as a "CFRP filament", and one fiber of the CF is also referred to as a "CF filament" or is also simply referred to as a "fiber".

Figure 1:
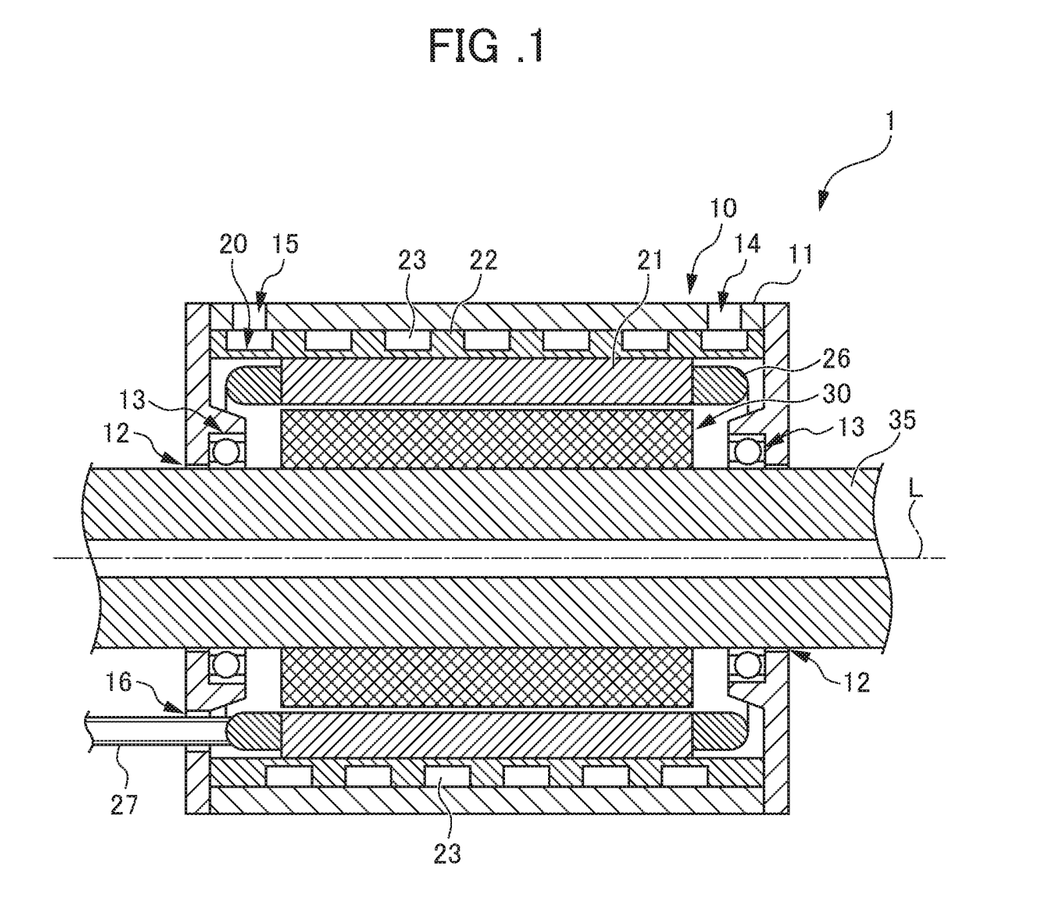
FIG. 1 is a cross-sectional view showing the configuration of a motor 1 according to an embodiment.

A motor 1 which includes a rotor 30 of the present embodiment and which serves as a rotary electric machine will first be described. FIG. 1 is a cross-sectional view showing the configuration of the motor 1 according to the present embodiment. The configuration of the motor 1 shown in FIG. 1 is an example, and as long as the rotor 30 of the embodiment can be applied, any configuration may be adopted.

As shown in FIG. 1, the motor 1 includes, as configuration requirements, a frame 10, a stator 20, the rotor 30, a rotary axis 35 and bearings 13. The frame 10 is an exterior member of the motor 1, and includes a frame main body 11 and an axis hole 12.

The frame main body 11 is a housing which surrounds and holds the stator 20. The frame main body 11 holds the rotor 30 through the bearings 13. The frame main body 11 includes a supply port 14, a discharge portion 15 and a hole portion 16. The supply port 14 is an opening for supplying a coolant to the flow path 23 of a stator frame 22, and is connected to the supply pipe (not shown) of the coolant. The discharge portion 15 is an opening for discharging the coolant circulated along the flow path 23, and is connected to the discharge pipe (not shown) of the coolant. The hole portion 16 is an opening which a power line 27 drawn from the stator 20 penetrates. The axis hole 12 is a hole which the rotary axis 35 (which will be described later) penetrates.

The stator 20 is a composite member which forms a rotary magnetic field for rotating the rotor 30. The stator 20 is formed in the shape of a cylinder as a whole, and is fixed to the interior of the frame 10. The stator 20 includes an iron core 21 and the stator frame 22.

The iron core 21 is a member within which a winding 26 can be arranged. The iron core 21 is formed in the shape of a cylinder, and is arranged within the stator frame 22. In the iron core 21, a plurality of grooves (not shown) are formed in an inner surface, and the winding 26 is arranged in the grooves. Parts of the winding 26 are protruded from both end portions of the iron core 21 in the axis direction of the iron core 21. The iron core 21 is formed into a multiplayer member by stacking a plurality of thin plates such as electromagnetic steel plates, and is produced by integrating the multiplayer member such as by adhesion or swaging.

The stator frame 22 is a member within which the iron core 21 is held. The stator frame 22 is formed in the shape of a cylinder, and is arranged outside the stator 20. The iron core 21 is securely joined to the stator frame 22 in order to receive reaction resulting from the torque of the rotor 30. As shown in FIG. 1, the stator frame 22 of the present embodiment includes, in the outer surface, the flow path 23 for cooling heat transmitted from the iron core 21. The flow path 23 is a spiral groove of one or a plurality of threads formed in the outer surface of the stator frame 22. The coolant (not shown) supplied from the supply port 14 of the frame main body 11 (the frame 10) is spirally circulated within the flow path 23 along the outer surface of the stator frame 22, and is thereafter discharged from the discharge portion 15 of the frame main body 11 to the outside.

The power line 27 which is electrically connected to the winding 26 is drawn from the iron core 21 of the stator 20. The power line 27 is connected to a power supply (not shown) installed outside the motor 1. When the motor 1 is operated, for example, a three-phase alternating current is supplied to the iron core 21, and thus the rotary magnetic field for rotating the rotor 30 is formed.

The rotor 30 is a part which is rotated by magnetic interaction with the rotary magnetic field formed by the stator 20. The rotor 30 is provided on the inner circumferential side of the stator 20. The configuration of the rotor 30 will be described later.

The rotary axis 35 is a member which supports the rotor 30. The rotary axis 35 is inserted so as to penetrate the axis center of the rotor 30, and is fixed to the rotor 30. A pair of bearings 13 are fitted to the rotary axis 35. The bearings 13 are members which support the rotary axis 35 such that the rotary axis 35 is freely rotated, and are provided in the frame main body 11. The rotary axis 35 is supported by the frame main body 11 and the bearings 13 so as to be freely rotated about the rotary axis line L. The rotary axis 35 penetrates the axis hole 12 so as to be connected to, for example, a cutting tool or a power transmission mechanism, a deceleration mechanism or the like (all of which are not shown).

In the motor 1 shown in FIG. 1, when the three-phase alternating current is supplied to the stator 20 (the iron core 21), a rotation force is generated in the rotor 30 by the magnetic interaction between the stator 20 where the rotary magnetic field is formed and the rotor 30, and the rotation force is output to the outside through the rotary axis 35. Although in the present embodiment, the motor 1 is described as the SPM type synchronous motor discussed previously, the motor 1 may be, for example, an IPM (Interior Permanent Magnet) type synchronous motor.

Figure 2:
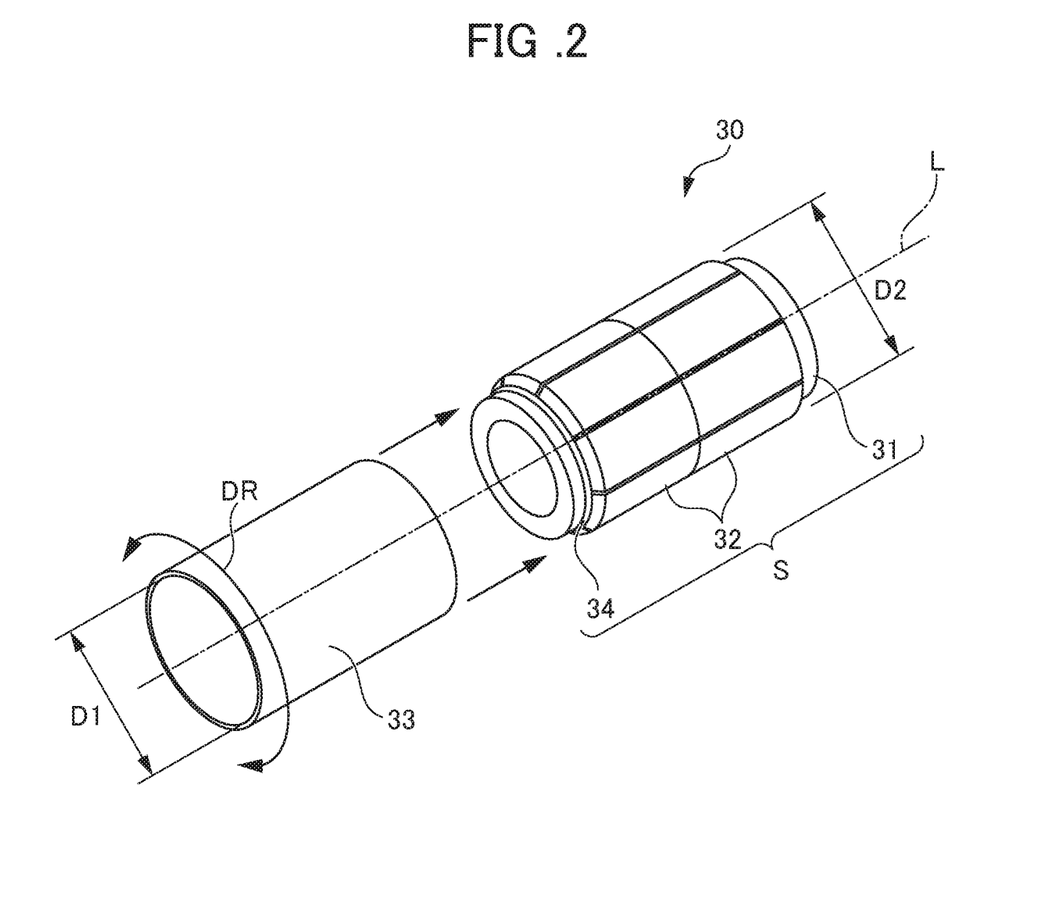
FIG. 2 is an exploded perspective view of a rotor 30.

The configuration of the rotor 30 will then be described. FIG. 2 is an exploded perspective view of the rotor 30. As shown in FIG. 2, the rotor 30 includes a sleeve (rotary member) 31, permanent magnets 32 and a cover tube 33. The sleeve 31 is a member to which a plurality of permanent magnets 32 are attached and which is formed substantially in the shape of a cylinder, and is provided between the rotary axis 35 (see FIG. 1) and the permanent magnets 32. The permanent magnets 32 are arranged along the circumferential direction DR of the sleeve 31. The sleeve 31 is formed of, for example, a magnetic material such as carbon steel. The rotor 30 having the sleeve 31 on the inner circumferential side is fitted to the outer circumference of the rotary axis 35 by an interference fit.

The permanent magnets 32 are members for generating a magnetic field, and as shown in FIG. 2, eight rows are provided on the outer circumferential side of the sleeve 31 along the circumferential direction DR (in FIG. 2, only the four rows on the front side are shown). In the eight rows of the permanent magnets 32, in the circumferential direction DR of the sleeve 31, the permanent magnets 32 for the north pole and the permanent magnets 32 for the south pole are alternately arranged. The permanent magnets 32 are adhered to the outer circumferential surface of the sleeve 31 through an adhesive layer 34. Although in the present embodiment, an example where the permanent magnets 32 in each of the rows are divided into two parts along the rotary axis direction in the rotor 30 described, there is no limitation to this configuration, and the permanent magnets 32 may be divided into three or more parts along the longitudinal direction of the rotor 30 or may not be divided.

The cover tube 33 is a cylindrical member for covering the permanent magnets 32. The cover tube 33 is fitted to the outer circumferential surface of the permanent magnets 32 arranged on the sleeve 31. The cover tube 33 is fitted to the outer circumferential surface of the permanent magnets 32, and thus it is possible to reduce the dropping off of the permanent magnets 32 from the rotor 30 by centrifugal force resulting from the rotation of the rotor 30.

The cover tube 33 is formed by winding the CF fiber bundle (tape-shaped CF) while a tension is being applied to a tube-shaped fixture and curing it with an applied resin. As the fiber material of the CF fiber bundle, not only CF (carbon fiber) but also, for example, materials having a specific intensity such as a glass fiber, an aramid fiber, a silicon carbide fiber, a boron fiber and a titanium alloy fiber can be used.

In the fitting of the cover tube 33 to the rotor 30, for example, a method (see Japanese Unexamined Patent Application Publication No. 2016-82773 and the like) can be used in which into the outer circumferential surface of a rotary axis having a tapered surface, a sleeve which likewise has a tapered surface is inserted so as to push out, to the outside, a cover tube provided on the outer circumferential side of the sleeve. By using the method as described above, the cover tube 33 can be fitted to the rotor 30 by a contraction force corresponding to an interference. In this way, on the cover tube 33, reaction which is large enough to hold the permanent magnets 32 acts inward in a radial direction against the centrifugal force produced when the rotor 30 is rotated. As described above, the reaction acts on the cover tube 33 inward in the radial direction, and thus it is possible to reduce the dropping off of the permanent magnets 32 from the rotor 30 by the centrifugal force. The "inward the radial direction" refers to a direction in which to extend close to the rotary axis line L from the outside of the rotor 30.

As shown in FIG. 2, the interference refers to the dimension of a part (D2-D1) of the outside diameter D2 of the permanent magnets 32 arranged on the sleeve 31 which is extended from the inside diameter D1 of the cover tube 33 before the diameter is increased (before the cover tube 33 is fitted). As the interference is increased, it is more difficult to fit the cover tube 33 to the outer circumferential surface of the permanent magnets 32 but larger reaction can be made to act inward in the radial direction from the cover tube 33 which is fitted.

Figure 3A:
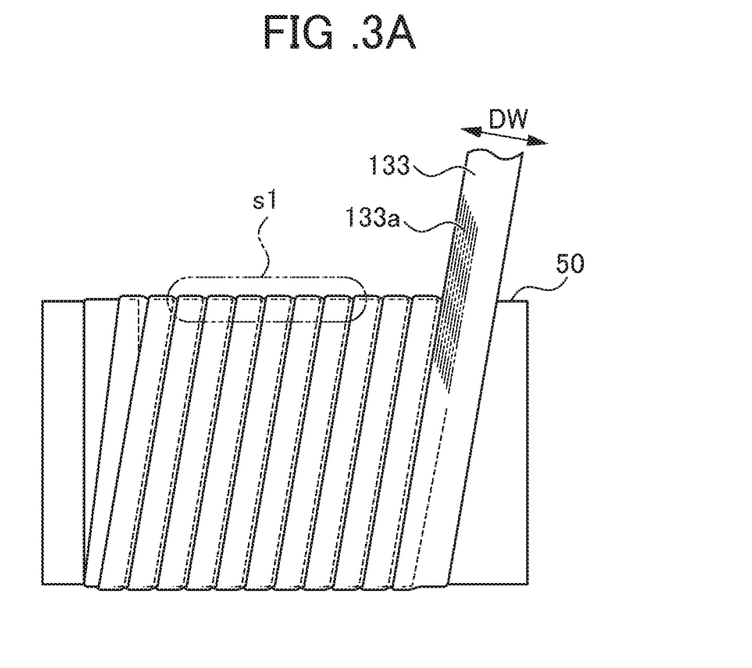
FIG. 3A is a conceptual diagram showing a step of producing a cover tube 33 in the embodiment.
Figure 3B:
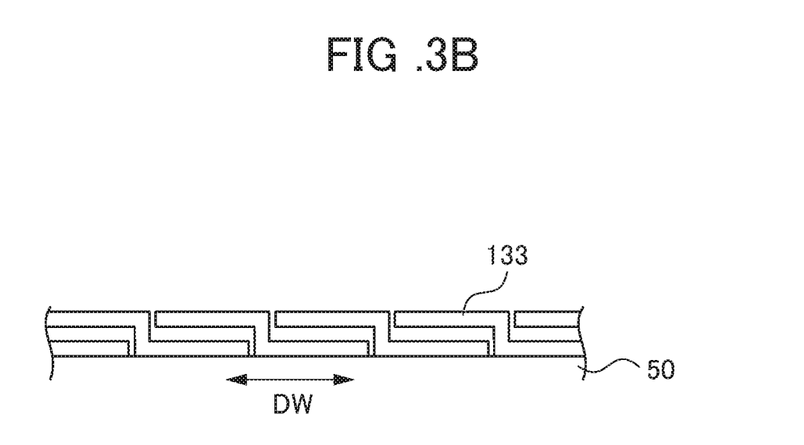
FIG. 3B is a schematic cross-sectional view of an s1 part in FIG. 3A.
Figure 3C:
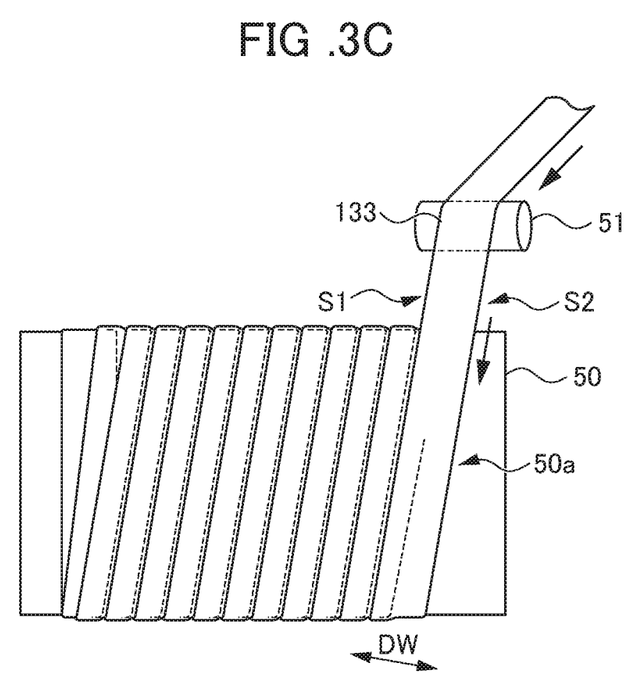
FIG. 3C is a conceptual diagram showing a method of winding a part of a CF fiber bundle 133 on a fixture 50 while slackening it.

The configuration of the cover tube 33 in the present embodiment will then be further described in detail. FIG. 3A is a conceptual diagram showing a step of producing the cover tube 33 in the present embodiment. FIG. 3B is a schematic cross-sectional view of an s1 part in FIG. 3A. FIG. 3C is a conceptual diagram showing a method of winding a part of the CF fiber bundle 133 on a fixture 50 while slackening it.

As shown in FIG. 3A, the cover tube 33 is formed by winding the CF fiber bundle 133 on the outer circumferential surface of the fixture 50 and then applying a resin. The orientation direction of a CF filament (one fiber of the CF) 133a included in the CF fiber bundle 133 is substantially parallel to the longitudinal direction of the CF fiber bundle 133. The width direction DW of the CF fiber bundle 133 is a direction which is orthogonal to the longitudinal direction of the CF fiber bundle 133. As shown in FIG. 3B, the CF fiber bundle 133 is wound in a spiral shape along the circumferential direction of the tubular fixture 50 such that parts of the CF fiber bundle 133 in the width direction DW overlap each other. The overlapping of the CF fiber bundle 133 is preferably set to, for example, about 0.3 to 0.5 when the width is assumed to be 1.

When the CF fiber bundle 133 is wound in a spiral shape along the circumferential direction of the tubular fixture 50 such that parts of the CF fiber bundle 133 in the width direction. DW overlap each other, as will be described later, in a part which does not overlap the CF fiber bundle 133 wound in the preceding round of winding (the part on which the CF fiber bundle 133 is wound in the subsequent round of winding), the fibers are brought into a slackened state. The state where the fibers are slackened refers to a state where no tension is applied to the fiber or a state where a tension lower than in a part to which a tension is applied is applied, and includes, for example, a state where the fiber is bent in the shape of a letter U and a state where the fiber meanders irregularly (or regularly).

In order to reduce a displacement the dimension of the tube caused by a pill which will be described later (a variation in the dimension of the outside diameter of the tube) and to enhance the tanglement of tear portions of the fiber, the CF fiber bundle 133 in the first layer may be slackened and wound so as not to overlap in the width direction DW of the CF fiber bundle 133 and the CF fiber bundle 133 in the second layer may be wound while a tension is being applied to the CF fiber bundle 133.

As a method of intentionally slackening the CF fiber bundle 133, for example, a larger number of CF filaments 133a included in the CF fiber bundle 133 may be bundled, the width of the CF fiber bundle 133 may be narrowed and the thickness may be increased. The thickness of the CF fiber bundle 133 is increased, and thus a space below the part which does not overlap is expanded in a radial direction, with the result that the fiber can be more likely to be slackened.

As shown in FIG. 3C, a rod-shaped member (including a roll and the like) 51 which is extended in a direction inclined with respect to the axial direction of the fixture 50 may be provided, and the CF fiber bundle 133 may be wound on the tubular fixture through the rod-shaped member 51. In FIG. 3C, for example, when the axial direction of the fixture 50 and the axial direction of the rod-shaped member 51 are made parallel to each other, the CF fiber bundle 133 is wound on the fixture 50 along the width direction DW with an approximately equal tension. On the other hand, when as shown in FIG. 3C, the rod-shaped member 51 is arranged such that the axial direction of the rod-shaped member 51 is inclined with respect to the axial direction of the fixture 50, in the tape-shaped CF fiber bundle 133, a tension is applied to the fiber fed from a side S1 away from the winding position 50a of the fixture 50, and a fiber fed from a side S2 close to the winding position 50a of the fixture 50 is slackened.

The axial direction of the tubular fixture 50 corresponds to the rotary axis direction of the sleeve 31 (rotary member). Hence, when the cover tube 33 formed with the CF fiber bundle 133 wound on the outer circumferential surface of the fixture 50 is fitted to the outer circumferential side of the rotor 30 (the permanent magnets 32), the OF fiber bundle 133 is spirally stacked in layers along the circumferential direction DR of the sleeve 31 such that parts thereof in the width direction DW overlap each other.

In the cover tube 33 of the present embodiment, the CF fiber bundle 133 is wound on the outer circumferential surface of the fixture 50 in a state where the CF fiber bundle 133 is not impregnated with a resin. The CF fiber bundle 133 is wound on the fixture 50, and is thereafter coated (impregnated) with the resin. As the resin which is applied to the CF fiber bundle 133, for example, an epoxy resin, an acrylic resin and the like can be used. The CF fiber bundle (at this time, substantially, the CFRP fiber bundle) 133 which is wound on the fixture 50 and which is coated with the resin is formed into the cover tube 33 by removing the fixture 50 after the resin is cured.

Figure 4A:
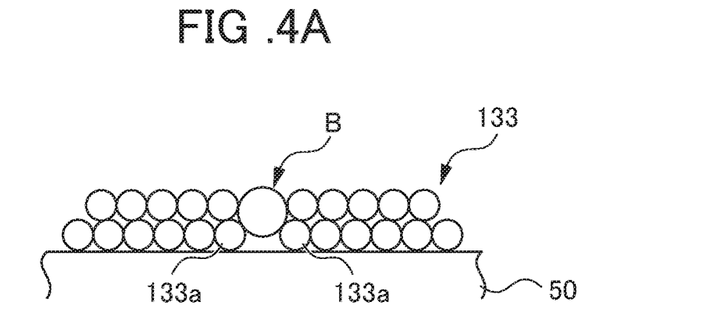
FIG. 4A is a schematic cross-sectional view of the fiber bundle 133 in which a pill B produced.
Figure 4B:
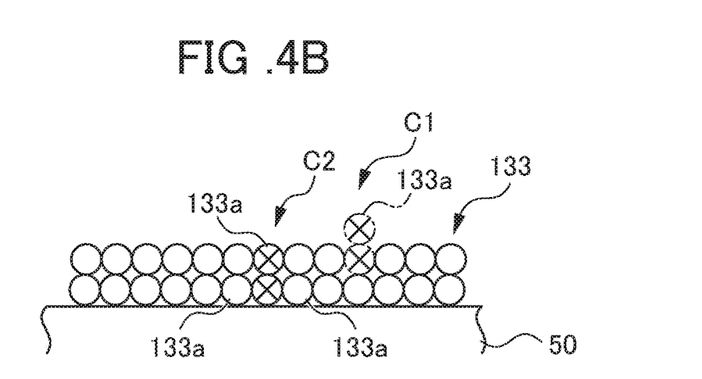
FIG. 4B is a schematic cross-sectional view of the fiber bundle 133 in which an overlapped part C is partially produced.
Figure 4C:
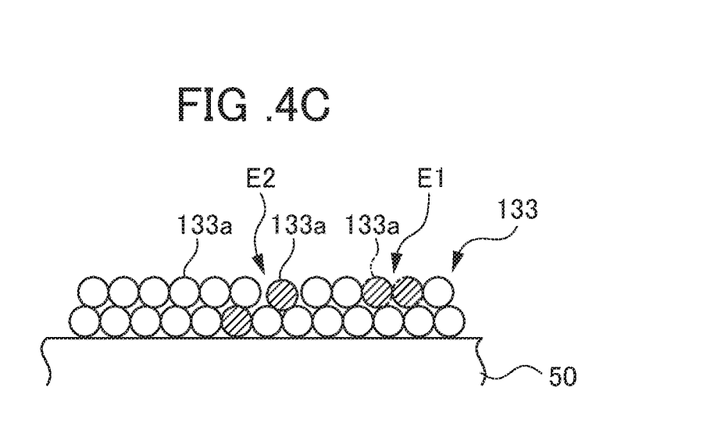
FIG. 4C is a schematic cross-sectional view of the fiber bundle 133 in which cuts are partially produced.

The configuration of the layers of the CF fiber bundle 133 wound on the fixture 50 in a state where the CF fiber bundle 133 is not impregnated with the resin will then be described. FIGS. 4A to 4C individually show the forms of failures which occur in the CF fiber bundle 133 wound on the fixture 50. FIG. 4A is a schematic cross-sectional views of the CF fiber bundle 133 in which a pill B is produced. FIG. 4B is a schematic cross-sectional view of the fiber bundle 133 in which an overlapped part C1 is partially produced. FIG. 4C is a schematic cross-sectional view of the CF fiber bundle 133 in which cuts are partially produced.

As shown in FIG. 4A, in the CF fiber bundle 133 wound on the fixture 50, the pill B may be produced. The pill B is formed in the shape of a bead resulting from the fibers being entangled with each other. In the present embodiment, since the CF fiber bundle 133 in the individual layers is not impregnated with the resin, when the CF fiber bundle 133 is wound on the fixture 50 in a spiral shape, in a part which does not overlap the CF fiber bundle 133 wound in the preceding round of winding (the part on which the CF fiber bundle 133 is wound in the subsequent round of winding), the fibers are brought into a slackened state. Hence, the pill B which is produced in the CF fiber bundle 133 on the upper layer side wound in the subsequent round of winding enters between the CF filaments 133a (slackened fibers) in the CF fiber bundle 133 on the lower layer side. Hence, the protrusion of the pill B to the upper layer side is reduced.

As shown in FIG. 4B, in the CF fiber bundle 133 in the upper layer in the CF fiber bundle 133 wound on the fixture 50, the overlapped part C1 of the CF filaments 133a may be produced. In FIG. 4B, the outlines of CF filaments 133a in which the overlapped part C1 is produced are indicated by chain double-dashed lines (imaginary lines), and in the cross sections thereof, x marks are provided. The overlapped part C1 shown in FIG. 4B indicates, as will be described later, a state before the overlapped part C1 enters between the slackened fibers. In the present embodiment, since the CF fiber bundle 133 in the individual layers is not impregnated with the resin, when the CF fiber bundle 133 is wound on the fixture 50 in a spiral shape, in the part which does not overlap the CF fiber bundle 133 wound in the preceding round of winding (the part on which the CF fiber bundle 133 is wound in the subsequent round of winding), the fibers are brought into a slackened state. Hence, the CF filament 133a of the overlapped part C1 produced in the CF fiber bundle 133 on the upper layer side enters, as indicated in an overlapped part C2, between the CF filaments 133a (the slackened fibers) of the CF fiber bundle 133 on the lower layer side. Hence, the protrusion of the CF filament 133a in the overlapped part C1 to the upper layer side is reduced.

As shown in FIG. 4C, in the CF fiber bundle 133 wound on the fixture 50, cuts may be partially produced. In FIG. 4C, in a tear portion E1 in which a cut is produced, the cross sections of the CF filaments 133a are hatched. The tear portion E1 shown in FIG. 4C indicates, as will be described later, a state before the slackened fibers are entangled with each other. In the CF filaments 133a, a tension when the CF fiber bundle 133 is wound on the fixture 50 is unlikely to act (or is prevented from acting) on the CF filaments 133a in which the cut is produced, and thus the fibers are brought into a slackened state as compared with the CF filaments 133a in which no cut is produced.

When as in the present embodiment, the CF fiber bundle 133 is wound on the fixture 50 in a spiral shape in the state where the CF fiber bundle 133 is not impregnated with the resin, in the part which does not overlap the CF fiber bundle 133 wound in the preceding round of winding (the part on which the CF fiber bundle 133 is wound in the subsequent round of winding), the fibers are brought into a slackened state. Hence, the CF filaments 133a in the tear portion E1 are entangled with the CF filaments 133a (the slackened fibers) on the lower layer side, and in that state, they are impregnated with the resin. In other words, in the CF fiber bundle 133 in the upper layer, the CF filaments 133a slackened by the production of the cut are entangled with the slackened CF filaments 133a of the CF fiber bundle 133 in the lower layer, and in that state, they are cured with the resin. Hence, in the CF fiber bundle 133 of the present embodiment, the CF filaments 133a can be interposed on the upper layer side and the lower layer side in which cuts are produced in the CF filaments 133a.

The configuration of the layers of a CFRP fiber bundle 233 wound on the fixture 50 will then be described as a comparative example. In the following description and drawings, parts which achieve the same functions as in the embodiment described above are identified with the same reference numerals or the same reference numerals for the end (the last two digits) as necessary, and thus repeated description will be omitted as necessary.

Figure 5A:
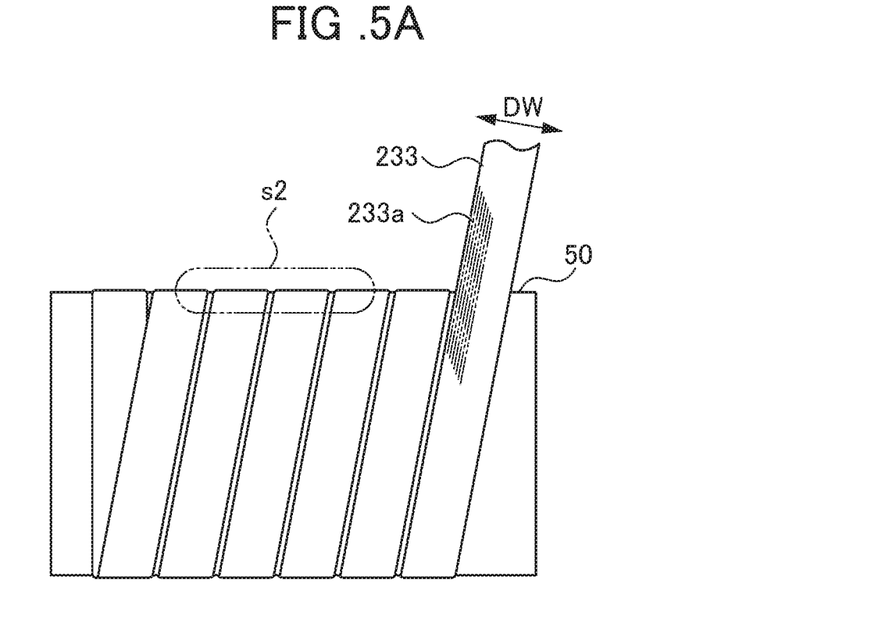
FIG. 5A is a conceptual diagram showing a step of producing a cover tube in a comparative example.
Figure 5B:
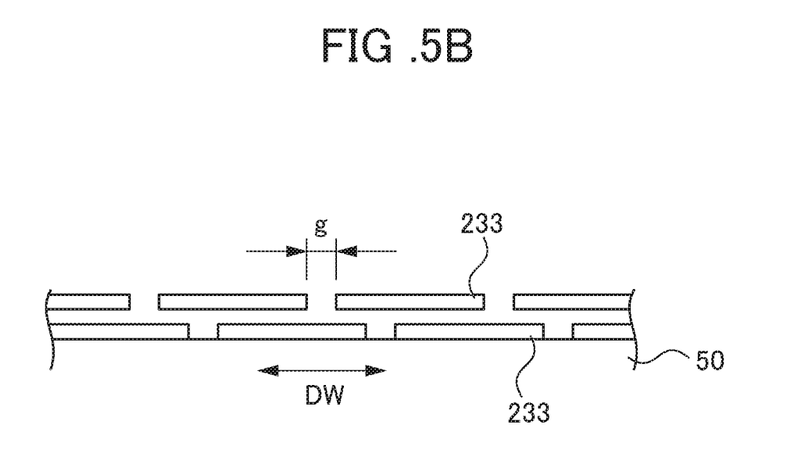
FIG. 5B is a schematic cross-sectional view of an s2 part in FIG. 5A.

FIG. 5A is a conceptual diagram showing a step of producing a cover tube in a comparative example. FIG. 5B is a schematic cross-sectional view of an s2 part in FIG. 5A. In the cover tube of the comparative example, as shown in FIG. 5A, the CFRP fiber bundle 233 is wound along the circumferential direction of the fixture 50 in a spiral shape so as to form a gap g (see FIG. 5B) between end portions in the width direction DW. In the cover tube of the comparative example, as shown in FIG. 5B, the CFRP fiber bundle 233 is wound twice. In the cover tube of the comparative example, the CFRP fiber bundle 233 may be wound such that the end portions in the width direction DW do not overlap each other and that the gap g is not formed.

In the cover tube of the comparative example, the CFRP fiber bundle 233 is wound on the fixture 50 in a state where the CFRP fiber bundle 233 is impregnated with the resin. In the comparative example, a fiber bundle 233 wound on the fixture 50 is formed into a cover tube by removing the fixture 50 after the resin is cured.

Figure 6A:
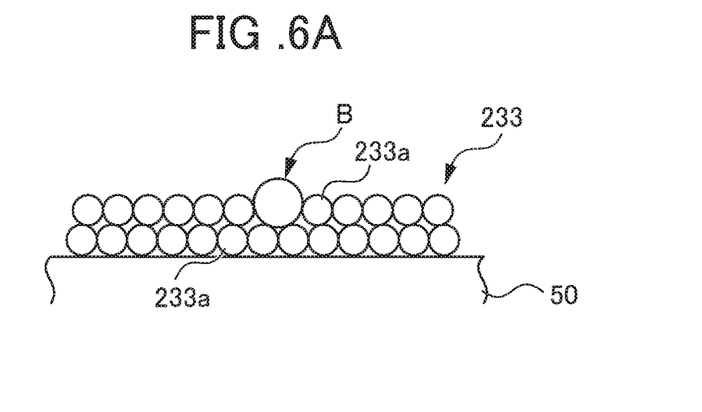
FIG. 6A is a schematic cross-sectional view of a fiber bundle 233 in which a pill B is produced.
Figure 6B:
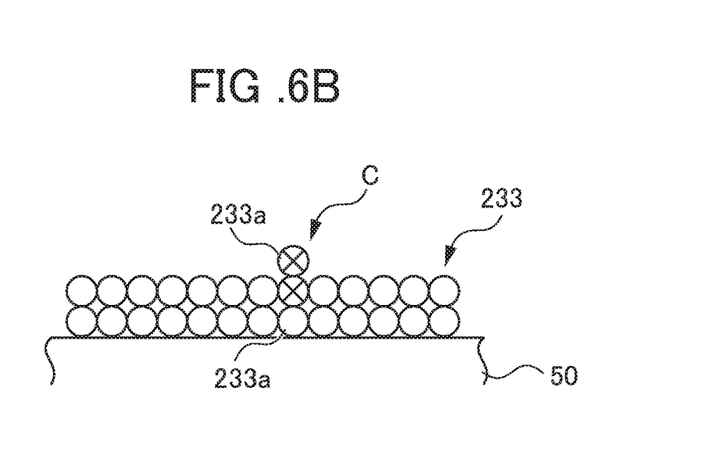
FIG. 6B is a schematic cross-sectional view of the fiber bundle 233 in which an overlapped part C is partially produced.
Figure 6C:
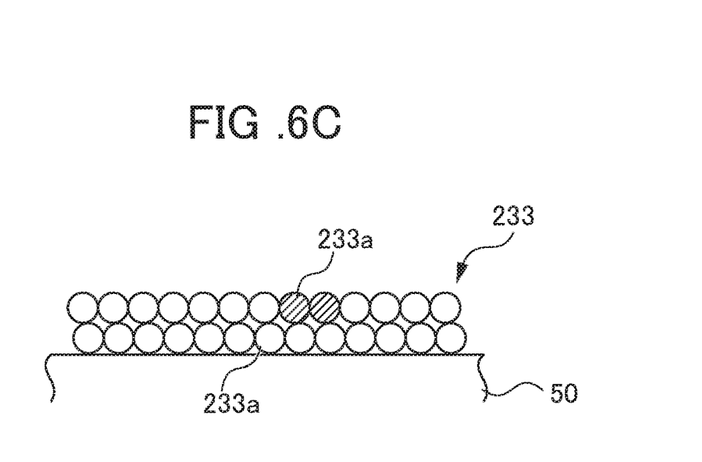
FIG. 6C is a schematic cross-sectional view of the fiber bundle 233 in which a cut is partially produced.

The configuration of the layers of the CFRP fiber bundle 233 wound on the fixture 50 will then be described. FIGS. 6A to 6C individually show the forms of failures which occur in the CFRP fiber bundle 233 wound on the fixture 50. FIG. 6A is a schematic cross-sectional view of the CFRP fiber bundle 233 in which a pill B is produced. FIG. 6B is a schematic cross-sectional view of the CFRP fiber bundle 233 in which an overlapped part C is partially produced. FIG. 6C is a schematic cross-sectional view of the CFRP fiber bundle 233 in which a cut is partially produced.

Since the CFRP fiber bundle 233 of the comparative example is impregnated with the resin, as shown in FIG. 6A, the pill B produced in the CFRP fiber bundle 233 on the upper layer side cannot enter between the CFRP filaments (one fiber of the CFRP) 233a in the CFRP fiber bundle 233 on the lower layer side so as to be protruded to the upper layer side. This is because since the CFRP fiber bundle 233 of the comparative example contains the resin, the movement of the CFRP filaments 233a is restricted. Hence, in the CFRP fiber bundle 233 on the upper layer side of the pill B, the CFRP filaments 233a are protruded to the upper layer side.

As shown in FIG. 6B, in the CFRP fiber bundle 233 of the comparative example, the overlapped part C produced in the CFRP fiber bundle 233 on the upper layer side is prevented from entering between the CFRP filaments 233a in the CFRP fiber bundle 233 on the lower layer side. This is because since the CFRP fiber bundle 233 of the comparative example contains the resin, the movement of the CFRP filaments 233a is restricted. Hence, in the CFRP fiber bundle 233 on the upper layer side, the overlapped part C is protruded to the upper layer side.

As shown in FIG. 6C, in the CFRP fiber bundle 233 of the comparative example, the CFRP filaments 233a in which the cut is produced are prevented from being entangled with the CFRP filaments 233a on the lower layer side. This is because since the CFRP fiber bundle 233 of the comparative example contains the resin, the movement of the CFRP filaments 233a is restricted. Hence, in the CFRP fiber bundle 233 of the comparative example, other CFRP filaments 233a cannot be interposed on the lower layer side of the part where the cut is produced in the CFRP filaments 233a. When as in the present comparative example, the CFRP fiber bundle 233 is wound on the fixture 50 so as to form the gap g between the CFRP fiber bundle 233, even in a state where the CFRP fiber bundle 233 is not impregnated with the resin, as described previously, the failures such as the protrusion of the pill to the upper layer occur.

As described previously, since the CF fiber bundle 133 of the present embodiment is wound on the fixture 50 in a spiral shape in the state where the CF fiber bundle 133 is not impregnated with the resin, in the part which does not overlap the CF fiber bundle 133 wound in the preceding round of winding, the fibers are brought into a slackened state. Hence, even when the pill, the overlapped part and the like are produced, the parts thereof enter between the slackened fibers and are entangled, and thus it is possible to reduce the protrusion of the CF filaments 133a to the upper layer side. In this way, in the cover tube 33 of the present embodiment, the dimension of the outside diameter of the tube is more uniform, and thus it is possible to reduce the rate of occurrence of a dimensional failure.

In the cover tube 33 of the present embodiment, the dimension of the outside diameter of the tube is more uniform, and thus a gap between the rotor 30 and the stator 20 (see FIG. 1) can be more narrowed. In this way, it is possible to reduce a decrease in torque efficiency in the motor 1, and thus it is possible to more enhance the motor performance of the motor 1.

In the CF fiber bundle 133 of the present embodiment, the CF filaments 133a in which cuts are produced are hardened with the resin in a state where they are entangled with the CF filaments 133a in which cuts are not produced. In this way, in the CF fiber bundle 133 of the present embodiment, other CF filaments 133a can also be interposed in the part in which cuts are produced in the CF filaments 133a. Hence, in the CF fiber bundle 133 of the present embodiment, the density of the fibers is more uniform, and thus at is possible to enhance the strength of the cover tube 33.

The CF fiber bundle 133 of the present embodiment is wound on the outer circumferential surface of the fixture 50 in a state where the CF fiber bundle 133 is not impregnated with the resin. In this way, after the winding of the CF fiber bundle 133, the outside of the cover tube 33 is pressed with a mold or the like, and thus it is possible to more flatly form projections and recesses (such as a pill and an overlapped part) produced in the CF fiber bundle 133. Hence, in the cover tube 33 of the present embodiment, the dimension of the outside diameter of the tube can be made more uniform.

Although the embodiment of the present invention is described above, the present invention is not limited to the embodiment described above, and various variations and modifications are possible as in a variation which will be described later and they are also included in the technical range of the present invention. The effects described in the embodiment are simply a list of most preferred effects produced from the present invention, and there is no limitation to the effects described in the embodiment. Although the embodiment described above and the variation which will be described later can be combined as necessary so as to be used, the detailed description thereof will be omitted.
(Variation)

Although in the embodiment, the example where the CF fiber bundle 133 is wound on the outer circumferential surface of the fixture 50 so as to form the cover tube 33 is described, there is no limitation to this example. The cover tube 33 may be formed by directly winding the fiber bundle 133 on the outer circumferential side of the permanent magnets 32 (see FIG. 2). Although in the embodiment, the example where the cover tube 33 is formed of a carbon fiber reinforced plastic (CFRP) is described, there is no limitation to this example. The cover tube 33 may be formed of the fiber reinforced plastic (FRP) illustrated previously or may be formed of a composite material which uses the fiber reinforced plastic as a main material.

EXPLANATION OF REFERENCE NUMERALS

1: motor, 20: stator, 30: rotor, 31: sleeve, 32: permanent magnet, 33: cover tube, 35: rotary axis, 133: CF fiber bundle, 133a: CF filament

What is claimed is:
1. A rotor comprising:
a rotary member;
a plurality of permanent magnets that are arranged on an outer circumferential side of the rotary member; and
a cover tube that is provided on a side of an outer circumferential surface of the plurality of the permanent magnets and that is formed with a fiber bundle in which a plurality of fiber reinforced plastic filaments are arranged along a longitudinal direction, wherein
the fiber bundle of the cover tube is spirally stacked in layers along a circumferential direction of the rotary member, and wherein
in each layer of the spirally stacked fiber bundle, fiber reinforced plastic filaments are spirally wound along the circumferential direction in a state where the fiber reinforced plastic filaments are not impregnated with a resin, such that in each of the fiber reinforced plastic filaments, a first portion of the fiber reinforced plastic filament, in a width direction, is slackened as compared to a second portion of the fiber reinforced plastic filament in the width direction.
2. The rotor according to claim 1, wherein the fiber bundle of the cover tube is coated with a resin in a state where the fiber bundle is spirally stacked in a plurality of layers along the circumferential direction of the rotary member.
3. The rotor according to claim 1, wherein the fiber reinforced plastic is a carbon fiber reinforced plastic.

* * * * *